(12) United States Patent
Droste et al.

(10) Patent No.: US 9,716,927 B2
(45) Date of Patent: Jul. 25, 2017

(54) STATUS-ASSISTED COMMUNICATIONS WITH A VEHICLE

(71) Applicant: General Motors LLC, Detroit, MI (US)

(72) Inventors: Scott Droste, Ferndale, MI (US); Khaled Rabbah, Canton, MI (US)

(73) Assignee: General Motors LLC, Detroit, MI (US)

( * ) Notice: Subject to any disclaimer, the term of this patent is extended or adjusted under 35 U.S.C. 154(b) by 94 days.

(21) Appl. No.: 14/270,066

(22) Filed: May 5, 2014

(65) Prior Publication Data

US 2015/0319511 A1 Nov. 5, 2015

(51) Int. Cl.
*G08B 21/00* (2006.01)
*H04Q 9/00* (2006.01)
*G07C 5/00* (2006.01)

(52) U.S. Cl.
CPC ............. *H04Q 9/00* (2013.01); *G07C 5/008* (2013.01); *H04Q 2209/43* (2013.01)

(58) Field of Classification Search
CPC ....... G10L 13/00; H04L 12/581; H04L 51/04; H04Q 9/00; H04Q 2209/40
USPC .................................................... 340/870.07
See application file for complete search history.

(56) References Cited

U.S. PATENT DOCUMENTS

| | | | | |
|---|---|---|---|---|
| 5,896,554 A | * | 4/1999 | Itoh | H04H 20/57 455/2.01 |
| 8,594,616 B2 | * | 11/2013 | Gusikhin | H04W 4/22 340/426.2 |
| 2004/0044454 A1 | * | 3/2004 | Ross | B60R 16/0231 701/36 |
| 2005/0197842 A1 | | 9/2005 | Bergmann et al. | |
| 2008/0108330 A1 | * | 5/2008 | O'Neil | H04M 3/42374 455/414.1 |
| 2011/0057613 A1 | * | 3/2011 | Taguchi | B60L 11/1816 320/109 |
| 2012/0030467 A1 | * | 2/2012 | Schaefer | H04L 9/0866 713/169 |

* cited by examiner

*Primary Examiner* — Mark Rushing
(74) *Attorney, Agent, or Firm* — Christopher DeVries; Reising Ethington P.C.

(57) ABSTRACT

A method of sending data from a central facility to a vehicle includes transmitting a vehicle identifier to a status server from a central facility located apart from the status server; obtaining at the central facility one or more vehicle status variables corresponding to the transmitted identity of the vehicle from the status server; and initiating a direct transmission of packet data from the central facility to the vehicle based on the content of the obtained vehicle status variables.

16 Claims, 2 Drawing Sheets

STATUS-ASSISTED COMMUNICATIONS WITH A VEHICLE

TECHNICAL FIELD

The present invention relates to vehicles and, more particularly, to wireless communication between a central facility and a vehicle based on information in a status server that is updated with information from the vehicle.

BACKGROUND

Vehicles use telematics units to send and receive both voice and data communications. Often, the communications are exchanged with a central facility, such as a call center operated by a telematics service provider. In one aspect of these communications, the central facility wirelessly transmits to the vehicle short message service (SMS) messages, which include data or instructions used by the vehicle. However, the SMS messages transmitted from the central facility are not guaranteed to arrive at the vehicle. Sometimes the data content of the SMS messages can be time-sensitive and it would be helpful to increase the chances of successfully communicating data to the vehicle.

SUMMARY

According to an embodiment, there is provided a method of sending data from a central facility to a vehicle. The method includes transmitting a vehicle identifier to a status server from a central facility located apart from the status server; obtaining at the central facility one or more vehicle status variables corresponding to the transmitted identity of the vehicle from the status server; and initiating a direct transmission of packet data from the central facility to the vehicle based on the content of the obtained vehicle status variables.

According to another embodiment, there is provided a method of facilitating the direct transmission of data from a central facility to a vehicle. The method includes receiving at a status server vehicle status variables associated with one or more vehicle identifiers; receiving at the status server a vehicle identifier from the central facility; determining that the vehicle identifier received from the central facility matches a vehicle identifier stored in the status server; and transmitting vehicle status variables associated with the matching vehicle identifier to the central facility.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
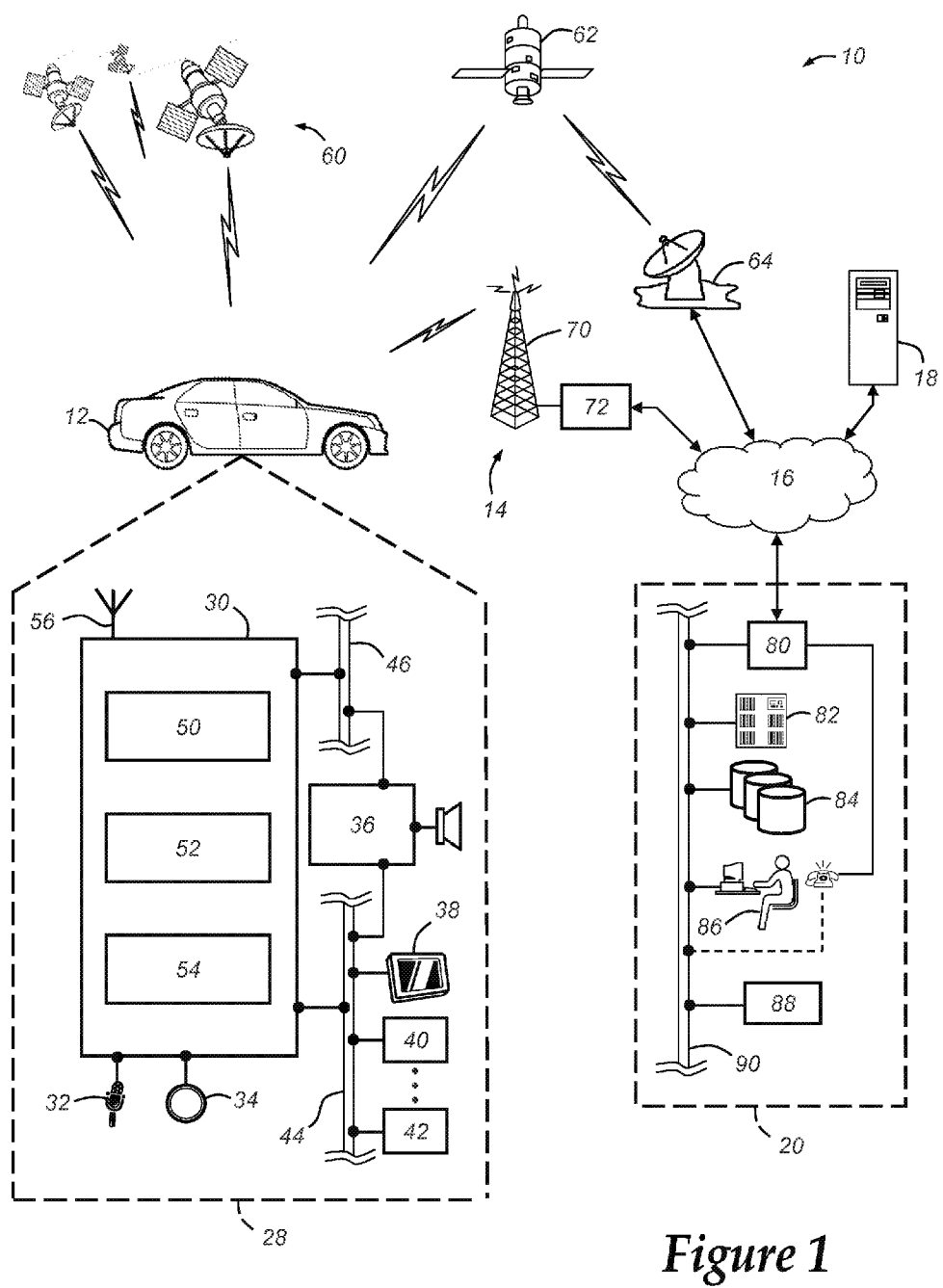
FIG. 1 is a block diagram depicting an embodiment of a communications system that is capable of utilizing the method disclosed herein.

Previously, central facilities such as call centers wirelessly transmitted data to vehicles or vehicle telematics units using short message service (SMS) messages. The SMS messages can provide data to the vehicle in a variety of forms as well as include instructions for the vehicle to carry out a particular task. But SMS messaging is a "best effort" messaging service, which means that the messaging is not guaranteed to be delivered. Moreover, not only are the SMS messages not delivered with certainty but SMS messaging does not include any time parameters within which the message must be delivered. As a result, the sender does not know if an SMS message can or will be delivered to the addressee at the time of sending the SMS message.

Apart from the inherent uncertainty of SMS messages themselves, the central facility sending the SMS messages is not aware of the operational state of the vehicle when the messages are sent. For example, the central facility may attempt to send an SMS message to the vehicle without knowing that the vehicle telematics unit of that vehicle is inoperable or has been switched off. In such an environment, the central facility may send SMS messages to a number of inoperable or inactive vehicle telematics units thereby incurring unnecessary airtime costs associated with sending SMS messages that are ultimately unanswered. SMS messaging can also cause additional latencies when used with a 4G LTE radio access technology (RAT). Data that is transmitted as an SMS message to vehicle telematics units using the 4G LTE RAT may need to switch to a 3G/WCDMA/UMTS RAT to be able to receive the SMS message. The change in RAT by the vehicle telematics unit may cause communication delay or communication failure as part of receiving the SMS message.

The system and method described below can send data directly from a central facility to a vehicle based on one or more vehicle status variables maintained in a status server. A plurality of vehicle telematics unit-equipped vehicles can wirelessly transmit vehicle status variables to the status server. After the vehicle telematics unit registers with a cell tower as would occur when the vehicle is started, the unit can also register with the status server by identifying itself to the status server using a vehicle identifier and sending one or more vehicle status variables to the status server. The vehicle status variables can provide a real-time operational snapshot of the vehicle, which can include a change in the RAT used at the vehicle, a change in ignition switch setting, or can indicate whether or not the vehicle telematics unit is fully operational, in a standby mode, or not operational. A central facility can identify the vehicle it wants to contact, provide a vehicle identifier associated with that vehicle to the status server, and then receive the vehicle status variables associated with the vehicle in response.

The central facility can then use the vehicle status variables to determine whether or not to directly send the vehicle data. For example, if the central facility plans to send data to the vehicle in the form of a command for the vehicle to upload software, the central facility may choose to delay sending such a command if the vehicle telematics unit is presently not operational or in a "standby" mode. In the past, the central facility would send the command as an SMS message despite the vehicle telematics unit existing in an "off" or "standby" mode. In that case, the vehicle would not received the message yet the central facility would incur the cost of sending the message. However, the status server and the vehicle status variables can prevent the central facility from sending data at inconvenient times. As used herein, the concept of "directly" sending data from the central facility to the vehicle involves wirelessly transmitting data via an IP-based cellular protocol or RAT, such as 4G LTE using session initiation protocol (SIP). In contrast, other RATs—including 3G/WCDMA/UMTS—are not IP-based but instead rely on circuit-switched technologies.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, HSPA+, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
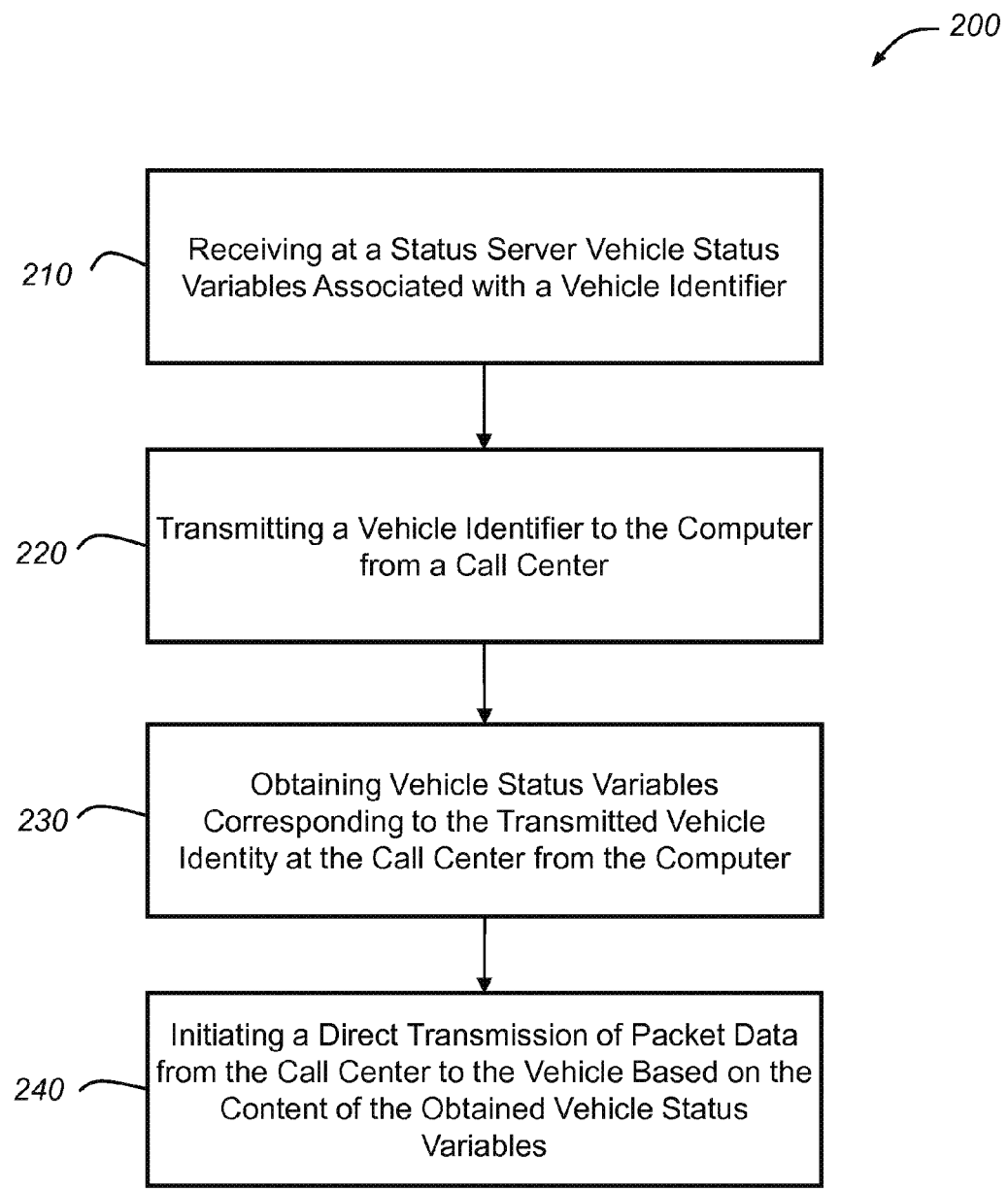
FIG. 2 is a flow chart of an embodiment of a method of sending data from a central facility to a vehicle.

Turning now to FIG. 2, there is shown an embodiment of a method 200 of directly sending data from a central facility to a vehicle. With respect to method 200, the central facility and status server will be described in terms of the call center 20 and the computer 18, respectively. However, it should be appreciated that different facilities could be used to implement the central facility and the status server. For instance, both the central facility and the status server could be carried out by the computer 18 and communications between the central facility and the status server travel between the computer 18 itself. Or the computer 18 could be used as the central facility while the wireless carrier system 14 could maintain a status server that is accessible by the computer 18 via the land network 16.

The method 200 begins at step 210 by receiving at the computer 18 vehicle status variables associated with a plurality of vehicle identifiers. The vehicle telematics unit 30 can register with the computer 18 using a vehicle identifier or other unique identifier and transmit one or more vehicle status variables to the computer 18. The computer 18 can receive this information from a plurality of vehicles each with their own vehicle identifier. When the vehicle telematics unit 30 of the vehicle 12 is operational, it may register with the computer 18 and provide information regarding the operation of the vehicle 12 in the form of vehicle status variables. For example, when the vehicle telematics unit 30 registers with the wireless carrier system 14, the unit 30 can then send a vehicle identifier of the vehicle 12 to the computer 18. The vehicle identifier can be a vehicle identification number (VIN), a mobile dialed number (MDN), a mobile identity number (MIN), a mobile equipment identifier (MEID), or other similar identifier. In addition to the vehicle identifier, the vehicle telematics unit 30 can send one or more vehicle status variables to the computer 18. Generally speaking, the vehicle status variables include information describing the current status of the vehicle telematics unit 30 or the operation of the vehicle 12.

Examples of the vehicle status variables include the current radio access technology (RAT) used by the vehicle telematics unit 30 or a change from one RAT to another RAT. For instance, the vehicle telematics unit 30 can change from a 4G LTE RAT to a 3G RAT and a vehicle status variable can indicate this change. Either the identity of the RAT or the change from one RAT to another RAT can be a vehicle status variable detected by the vehicle telematics unit 30 and wirelessly transmitted from the vehicle 12. In another example, the operational state of the vehicle telematics unit 30 can be a vehicle status variable that is detected and provided to the computer 18. The operational state of the vehicle telematics unit 30 can be signified by one of several modes each of which includes a level of function. The vehicle telematics unit 30 can operate in an "on" mode that provides the fully functionality of the unit 30 and an "off" mode that provides no or very limited functionality. And the vehicle telematics unit 30 can also operate in a "standby" or discontinuous-receive (DRx) mode during which time the unit 30 may have some limited functionality. This limited functionality may permit the vehicle telematics unit 30 to remain operational for only a portion of the time (e.g., for ten minutes every four hours) so that energy can be conserved. Thus, while the vehicle telematics unit 30 exists in the standby mode it may not be able to receive wireless transmissions of data.

It is also possible to include the position of a vehicle ignition switch as a vehicle status variable. For example, the vehicle status variable can include whether the ignition is "off," "on," or in an "accessory" position or state. The vehicle status variable can include a change in state (e.g., from "off" to "on") or the state itself. The computer 18 can receive the vehicle identifier and the vehicle status variable (s) from the vehicle telematics unit 30. As can be appreciated from FIG. 1, the vehicle telematics unit 30 can wirelessly transmit the vehicle identifier and vehicle status variable(s) to the computer 18 via the wireless carrier system 14 and the land network 16. The computer 18 can receive the vehicle identifier and vehicle status variable(s) and maintain them in a registry that can be implemented as a searchable database. Such a database can include vehicle identifiers and the vehicle status variables associated with each vehicle identifier. As part of receiving vehicle status variables, the computer 18 can transmit a set of instructions to the vehicle telematics unit 30. These instructions can provide rules by which the vehicle telematics unit 30 updates the computer 18 with vehicle status variables. For instance, the instructions can direct the vehicle telematics unit 30 to transmit vehicle status variables to the computer 18 after a defined period of time has passed or when one or more vehicle status variables change. In addition, the computer 18 can later transmit additional instructions that supplant or supersede the previously-sent instructions. The method 200 proceeds to step 220.

At step 220, a vehicle identifier is transmitted to the computer 18 from a separately-located call center 20. When the call center 20 plans to transmit data to a particular vehicle 12, it can transmit the vehicle identifier of the particular vehicle 12 to the computer 18 to obtain vehicle status variables associated with the vehicle 12. The call center 20 can use the vehicle status variables of a particular vehicle 12 to determine the operational state of the vehicle 12, which may influence whether or not the call center 20 transmits data immediately, waits a period of time before transmitting the data, or decides not to transmit the data. For example, the vehicle identifier can be received by the computer 18, which automatically searches its database to locate an entry corresponding to the received vehicle identifier. When the computer 18 matches the received vehicle identifier with a vehicle identifier stored with one or more vehicle status variables, the vehicle status variables can be accessed and generated as a data message to be sent to the call center 20. In one implementation, the call center 20 can register with the computer 18 using a call center identifier and one or more vehicle identifiers that are associated with the call center identifier. The computer 18 can then store the call center identifier in its database and periodically search for updates for any vehicle status variables associated with the vehicle identifiers. The method 200 proceeds to step 230.

At step 230, one or more vehicle status variables corresponding to the transmitted vehicle identifier are obtained at the call center 20 from the computer 18. When the call center 20 requests the vehicle status variables associated with the vehicle identifier, the computer 18 can generate a data message including those variables and transmit them to the call center 20. As noted above, the computer 18 can transmit the data message when the call center 20 contacts or registers with the computer 18. However, the computer 18 can also maintain the identity of the call center 20 and the vehicle identifiers the call center 20 is monitoring in order to periodically transmit the vehicle status variables after the passage of a period of time or when one of the vehicle status variables changes. The method 200 proceeds to step 240.

At step 240, a direct transmission of packet data from the call center 20 to the vehicle 12 is initiated based on the content of the obtained vehicle status variables. The call center 20 may determine if or when packet data will be transmitted to the vehicle telematics unit 30 based on the content of the vehicle status variables and the content of the packet data. For instance, the call center 20 may plan to send a software update to the vehicle 12. Before doing so, the call center 20 may access one or more vehicle status variable standards to be met before sending content as packet data. Content, such as software updates, can be associated with the vehicle status variable standards and those standards may need to be met before the packet data will be transmitted. The vehicle status variable standards associated with sending software updates could be that the vehicle telematics unit 30 has switched from "on" to "standby" and that the RAT used by the unit is 4G LTE. When both of those standards or conditions have been met, the software update can be sent. The call center 20 can receive one or more vehicle status variables from the computer 18 for the vehicle 12 it intends to send the software update to and determine that the vehicle status variables meet the standards before sending the software update. Otherwise, the call center 20 can decide to delay sending the software update until the vehicle status variable standards are met. In that case, the call center 20 can set a flag or trigger with the vehicle identifier to which the software update will be sent. When the computer 18 provides updated vehicle status variables, those variables can be compared to the vehicle status variable standards for sending software updates to determine if the vehicle 12 is now in a condition to receive the software update.

The comparison between vehicle status variables and vehicle status variable status variable standards can be applied to other actions that are carried out at the call center 20. For example, locking or unlocking doors can be associated with the vehicle telematics unit 30 existing in an "on" or "standby" mode. Also, the "direct" sending of packet data to the vehicle telematics unit 30 from the call center 20 involves sending data to the vehicle via an IP-based cellular system rather than a circuit-switched cellular system, as is discussed above. The IP-based cellular system can implement data messaging using a number of different techniques, such as the extensible messaging and presence protocol (XMPP) defined in RFCs 6120-6122 or the session initiation protocol (SIP) based SIP for Instant Messaging and Presence Leveraging Extensions (SIMPLE) protocol. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of directly sending data from a central facility to a vehicle, comprising the steps of:
   (a) transmitting a vehicle identifier to a status server from a central facility located apart from the status server;
   (b) obtaining at the central facility one or more vehicle status variables corresponding to the transmitted identity of the vehicle from the status server, wherein the vehicle status variables indicate whether a radio access technology (RAT) of a vehicle telematics unit has changed from one RAT to another, different RAT and
   (c) initiating a direct transmission of packet data from the central facility to the vehicle based on the content of the obtained vehicle status variables.

2. The method of claim 1, further comprising the step of initiating the direct transmission of packet data based on the content of the packet data to be transmitted.

3. The method of claim 1, further comprising the step of comparing the obtained vehicle status variables with one or more vehicle status variable standards.

4. The method of claim 1, further comprising the step of registering the central facility with the status server using a central facility identifier and one or more vehicle identifiers.

5. The method of claim 1, further comprising the step of transmitting a set of instructions from the status server to the vehicle, wherein the instructions control when a vehicle telematics unit sends vehicle status variables.

6. The method of claim 1, wherein the vehicle status variables further comprise an operational state of a vehicle telematics unit.

7. The method of claim 1, wherein the vehicle status variables further comprise an operational state of a vehicle ignition switch.

8. The method of claim 1, wherein the direct transmission of packet data is sent by an extensible messaging and presence protocol (XMPP) or a session initiation protocol (SIP) for instant messaging and presence leveraging extensions (SIMPLE) protocol.

9. A method of facilitating the direct transmission of data from a central facility to a vehicle, comprising the steps of:
 (a) receiving at a status server vehicle status variables associated with one or more vehicle identifiers, wherein the vehicle status variables indicate whether a radio access technology (RAT) of a vehicle telematics unit has changed from one RAT to another different RAT;
 (b) receiving at the status server a vehicle identifier from the central facility;
 (c) determining that the vehicle identifier received from the central facility matches a vehicle identifier stored in the status server; and
 (d) transmitting vehicle status variables associated with the matching vehicle identifier to the central facility.

10. The method of claim 9, further comprising the step of directly sending packet data from the central facility to the vehicle based on the vehicle status variables.

11. The method of claim 10, wherein the direct transmission of packet data is sent by an extensible messaging and presence protocol (XMPP) or a session initiation protocol (SIP) for instant messaging and presence leveraging extensions (SIMPLE) protocol.

12. The method of claim 9, further comprising the step of registering the central facility with the status server using a central facility identifier and one or more vehicle identifiers.

13. The method of claim 9, further comprising the step of transmitting a set of instructions from the status server to the vehicle, wherein the instructions control when a vehicle telematics unit sends vehicle status variables.

14. The method of claim 9, wherein the vehicle status variables further comprise an operational state of a vehicle telematics unit.

15. The method of claim 9, wherein the vehicle status variables further comprise an operational state of a vehicle ignition switch.

16. The method of claim 9, wherein the status server and the central facility are located at the same facility.

* * * * *